Oct. 14, 1947.                F. AUGHTIE ET AL                2,429,087
                   ELECTRICAL RESISTANCE STRAIN GAUGE
                           Filed Oct. 8, 1943
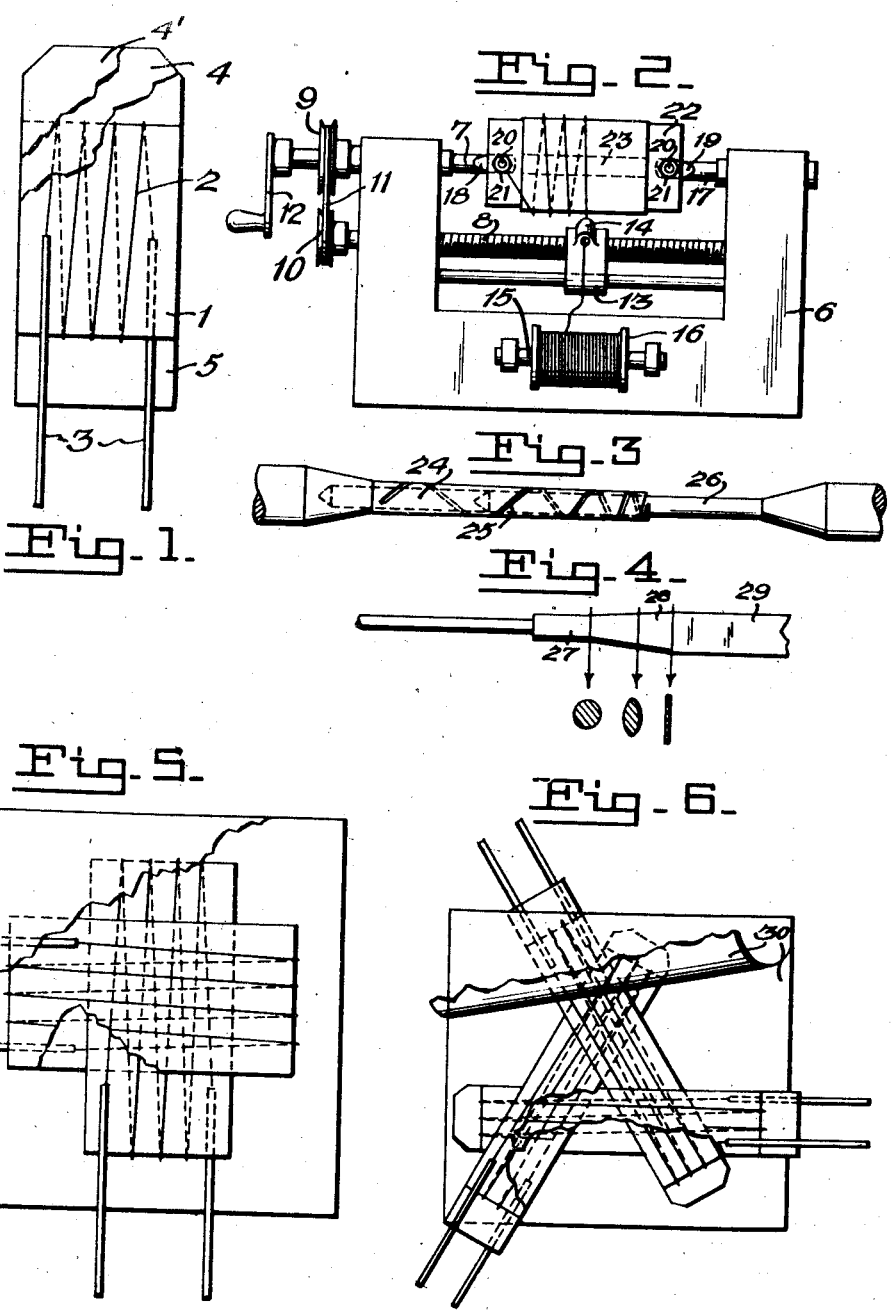
Inventors
Frank Aughtie,
Frank R. Thurston and
Eric P. Coleman Patented Oct. 14, 1947

2,429,087

UNITED STATES PATENT OFFICE 2,429,087

ELECTRICAL RESISTANCE STRAIN GAUGE

Frank Aughtie, Frank Russel Thurston, and Eric Pierce Coleman, Teddington, England Application October 8, 1943, Serial No. 505,556
In Great Britain October 8, 1942

5 Claims. (Cl. 201—63)

This invention relates to the production of strain gauges of the type comprising an electrical conductor which is attached to the specimen or object so as to be strained with it, and the strain being measured by determining the change in electrical resistance of the conductor.

To obtain a high value of resistance of the gauge a considerable length of conductor is necessary, and to reduce the gauge-length the conductor is brought into a zig-zag formation and bonded over its length by insulating adhesive to a sheet, or between sheets, of paper or the like, the whole being cemented to the specimen or object. Hitherto the zig-zag formation has been produced by methods involving carrying the conductor to and fro and round pins or the like located in two rows at the apices of the zig-zag so that the zig-zag is essentially uniplanar. The minimum spacing is then determined by the diameter of the pins, because in practice this spacing is greater than insulation requirements even when, as is usually to be preferred on account of heat dissipation, the conductor is wound in the bare condition. The prior methods are also complicated and are hardly practicable with a strip conductor.

The present invention provides a construction which lends itself to very simple methods of production which can readily be carried out on repetition lines. According to the invention the conductor is wound quasi-helically on and firmly secured to a thin layer of insulating material adapted to serve as a support. By "firmly secured" we mean secured in such a manner as to ensure that when the gauge is properly attached to the specimen or object by means of an adhesive the whole of the conductor will share in the straining of the specimen or object. In practice this is attained with the greatest certainty by bonding the conductor to the support over the whole length of the conductor, the bonding being of a character which in effect converts the conductor, support and any cover layers into an integral composite whole. Satisfactory results can nevertheless be obtained with a bond extending over something less than the whole length of the conductor, provided the unbonded portions are well distributed.

The invention will now be further described with reference to the accompanying drawings in which Figure 1 is an elevation of one form of gauge in accordance with the invention, Figure 2 illustrates diagrammatically a simple form of winding machine for use in the production of gauges according to the invention, Figure 3 illustrates diagrammatically another form of mandrel for use in winding gauges according to the invention, Figure 4 illustrates diagrammatically a jig which can be used in a subsequent step to winding on the mandrel of Figure 3, Figures 5 and 6 illustrate examples of multiple gauges in accordance with the invention.

Referring to Figure 1 the gauge there shown comprises a support 1 for example of thin paper or fabric, on which is wound quasi-helically a fine conductor 2. In this example end connections are made by relatively stout leads 3 of ribbon form conductor. The winding is protected by thin cover layers 4, 5 which may again be of thin paper. The layer 4 is shewn broken away to disclose the winding; it will be understood that this layer will cover the whole winding, and will in general be of the same shape as the layer 5. As above explained it is important that the conductor 2 should be firmly secured to the support 1, and the cover layers 4, 5 should also be firmly secured so that the complete article behaves as an integral unit when secured to a specimen or object. To this end the whole is bonded together by a suitable insulating composition.

To avoid crowding of the figures, the turns of conductor 2 are shown relatively widely spaced. But in practice since no question of accommodating winding pins arises, the spacing of the turns can be reduced to a value determined mainly by considerations of insulation and since alternate limbs are on opposite faces of the support 1, the effective spacing can be reduced to half that necessary between adjacent turns. It will be understood that the spacing need not be reduced to the very minimum permitted by insulation considerations alone. It may be desirable for example to use a somewhat wider spacing on account of heat dissipation or even merely on account of convenience in manufacture. Even with such wider spacing a much higher resistance can be accommodated in a given area of gauge than with prior methods, thereby reducing errors due to changes in lead resistance and to extraneous disturbances.

The invention enables particularly small gauges having a reasonable resistance to be made and also enables strip conductor to be used without difficulty when that is preferred, for instance, on account of its greater ratio of surface to cross section which permits greater heat dissipation and therefore higher current density to be used.

By way of example gauges in accordance with the invention can be readily produced with a 1 mil diameter conductor of 80/20 nickel chromium alloy or of "Eureka" alloy, with a pitch of 50 turns per inch. Such a gauge with the nickel chromium alloy winding has a resistance of about 7 ohms per square millimetre of winding. This is by no means the limit as pitches down to 200 per inch and beyond can be wound in practice with the same conductor. On the other hand we have found that by using a much coarser pitch, say 6 turns per inch, and a cover layer of absorbent paper similar to blotting paper attached so as not to become impregnated right through with the bonding agent, the adhesive (cellulose acetate cement or fish glue) used for attaching the gauge to the specimen appears to set more rapidly. At any rate full sensitivity is, effectively, obtained in a much shorter time.

Gauges according to the invention can readily be wound in a winding machine on the lines of that shown in Fig. 2. This comprises a frame 6 supporting a spindle 7 and a lead screw 8, the spindle and lead screw being coupled together in the appropriate ratio by any suitable means such as the pulleys 9, 10 and belt 11. Means such as a hand crank 12 provides for rotation of the mandrel. The lead screw carries a nut 13 provided with a guide 14 for the conductor, while a spindle 15 on the base of the frame 6 supports a reel indicated at 16 carrying the supply of conductor. No tension device is shown as in dealing with wire of the fineness here in question tension is conveniently applied by the operator's fingers and thumb.

The machine shown in Fig. 2 is designed to wind the conductor on a flat support. As such a support even if stiff enough to receive the winding without reinforcement in the plane of the support, will not in general be stiff enough in a direction normal to its own plane, a tail spindle 17 coaxial with the spindle 7 is provided and the support secured to both spindles. The support is most conveniently located in or substantially in a diametral plane of the mandrel and this is provided for in the illustrated example by cutting away half the thickness of both spindles to leave flats at 18, 19, respectively. Screws and nuts 20, 21 are provided to secure the support in position.

A support of thin paper or fabric needs reinforcement in its own plane during winding as well as normally to its own plane. For this purpose we provide a thin steel strip 22 and we then prefer the support 1 to be in the form of a loop of paper which may be slipped over the strip 22 or produced by wrapping the paper round the strip 22 with a narrow overlap at 23. To enable the support 1 to be slid easily off the steel strip 22 after winding the latter may be very slightly tapered in the width. It would be possible to use a single layer of paper as the support in which case one half of the turns will be on the strip 22 itself and great care would then be necessary in removing the wound support from the strip 22.

Before wrapping upon the strip 22, or after wrapping and before or after winding, the support is provided with a coating of or impregnated with an adhesive insulating bonding material preferably of thermoplastic or thermosetting nature. For example a phenol formaldehyde varnish may be used, such as that sold under the name Bakelite varnish V. 10974. If the gauge is to be used in high temperature conditions the support material and bonding agent will be selected to suit. For example the support may be of asbestos paper and the bonding agent of a stoving or firing glaze. The cover layers 4, 5 are applied before or after removal of the wound support from the strip 22 and the whole then thoroughly bonded together by the application of heat and/or pressure.

Excess of bonding agent should be avoided so that the cover layers do not become impregnated right through as this may render it difficult to secure the gauge to the specimen or object by the use of such adhesives as cellulose acetate cement or fish glue. For the same reason care should be taken to avoid the bonding material getting on the outside of the cover layers. We have found it convenient to use two cover layers, the inner one previously impregnated with the bonding material, the outer one being unimpregnated. Such second layer is shown at $4^1$ in Fig. 1. On the face which will not be used for glueing, the outer unimpregnated layer can be omitted.

Alternatively to winding in the flat, winding may be effected with the support in cylindrical form, flattening being subsequently effected. This method is particularly useful where gauges of very small length (length being the dimension in the direction of the limbs of the zig-zag) are required. For this purpose a cylindrical mandrel which can be slightly contracted after winding to permit the wound support to be slid off, is desirable. One convenient form is shown in Figure 3. Here the mandrel 24 is tubular and has a narrow slot 25 which gives it enough flexibility to permit the desired expansion and contraction without leaving any excessive gaps. As shown the slot may advantageously be of helical form of progressively increasing pitch. The tail spindle has an end section 26 which is entered into the mandrel for winding, its diameter being such as to expand the mandrel slightly as compared with its diameter when free. After winding and removal from the mandrel, the wound support may simply be flattened between plates or by passing between rollers, or to ensure formation of the folds in exact position, the wound support may before pressing be passed over a creasing jig in the form shown in Figure 4. This jig comprises a cylindrical portion 27 which will easily enter the support, followed by an intermediate section 28 of constant perimeter which leads smoothly to a flat portion 29 wide enough to hold the wound support flat. The support may pass directly from the portion 29 to rollers which complete the flattening operation.

As before, the support is coated or impregnated with bonding material, cover layers are attached, and the whole well bonded together. The cover layers may be formed by a single wrap applied before flattening, or two layers may be applied after flattening. The bonding material may be applied before wrapping on the mandrel, or after wrapping and before or after winding. It may even be applied after flattening, but if applied before flattening, the cover layers should also be applied before flattening to avoid adhesion to the flattening means.

The leads 3 above mentioned may be secured by soldering or preferably by spot welding. Care should be taken when the leads lie in the same direction as the conductor, that the joint is at the end of the lead otherwise there is a risk that the portion of the lead beyond the joint may overlap the conductor and affect the resistance by an indefinite and varying amount. It is also desirable, especially in the case of gauges comprising a comparatively small number of turns, that the bond between leads and support, or cover layers should be localised at or very near the weld so that the total deformation of the test surface over a length extending beyond the gauge length, but within the length of the lead, is not applied to that short length of the conductor adjacent to the lead, thereby giving rise to an error. For this purpose a thread of cotton or the like may be laid across the leads immediately outside and at right angles to the gauge length. This has the further advantage of reinforcing the securing of the leads in the complete gauge against accidental damage. It is to be understood that according to the form and situation of the test object to which the gauge is finally to be secured, the leads can be placed in the best positions within the gauge and brought out at the most suitable angles.

In selecting the metal of which the leads are to be made various factors need to be taken into consideration. When the conductor is of nickel-chromium alloy, the leads may be of the same alloy as this will facilitate welding and also has the advantage when connected to copper external conductors of generating very low thermoelectric E. M. F. This alloy is difficult to solder, and for this reason "Eureka" leads may be used which are much easier to solder but give a substantially higher thermoelectric E. M. F. When the conductor itself is of "Eureka" the leads may be of Eureka or even of copper. The leads may be attached before or after winding. The former permits an easier and more exact adjustment of gauge resistance, since the length of wire can be directly measured, but in this case a more elaborate winding machine is required.

The invention lends itself particularly well to the construction of multiple gauges, that is to say gauges comprising a plurality of conductors, usually having their limbs extending in different directions. Fig. 5 for instance shows a multiple gauge having two windings at right angles to one another. If the supports are of single thickness, a layer of insulation such as paper is interposed between the two windings, as well as cover layers on the outer faces, the whole being bonded together. But if as above described each gauge is wound on a loop of paper, one loop can be slightly opened and the other slipped through it, as indicated in Fig. 5, in which some parts are broken away to disclose the construction, so that only outer cover layers are required, though intermediate additional layers may also be used if desired. Also although the two windings are shown with wholly separate leads, one end of each winding might be joined to a common lead. Fig. 6 shows a multiple gauge with three windings relatively at 60°. Here the three individual gauges are bonded together both by slipping the support of one through that of another in order and by cover layers such as 30. It is a feature of our method of constructing such gauges that mechanical symmetry can be obtained between separate windings by assembling so that each support loop encloses one and is enclosed by another. The lead junctions in these multiple gauges should as shown lie outside the region where one support crosses another to avoid the risk of cutting into and short-circuiting the turns of another winding.

The invention also lends itself particularly well to the production of gauges which are shaped during the process of bonding the gauge into one composite whole into a form most suitable for attachment to the test surface, when this is not flat or of simple and restricted curvature. For instance we have, by our method, constructed gauges shaped to fit in the root of a screw thread. According to the shape desired, it may be preferable either to complete the bonding and shaping in a single mould, or the bonding may be partly carried out between flat, or partly formed plates, the bonding and shaping being completed in one or more later moulds. Where convenient the test surface itself may form one part of the mould, and the process can then be adapted so that the gauge is secured to the test surface, during the period of bonding together, wholly or partially, the composite parts of the gauge. Such simultaneous bonding and attachment can also be applied when the test surface is flat. When the gauge needs any considerable degree of shaping, it is desirable to wind it on a more easily distortable material than paper, such as fabric.

What we claim is:

1. An electrical resistance strain gauge comprising a first flat loop of thin sheet insulating material, a second flat loop of thin sheet insulating material set across and within said first loop, a quasi-helical, conductive, strain sensitive winding on each of said loops, and insulating material bonding said loops and windings into an effectively integral structure.

2. An electrical strain gauge comprising a plurality of flat loops of thin sheet insulating material, said loops being symmetrically arranged and each passing within the next loop in order, a quasi-helical, conductive, strain sensitive winding on each of said loops, and insulating material bonding said loops and windings into an effectively integral structure.

3. A method of producing an electrical resistance strain gauge including the steps of wrapping a sheet of thin insulating material upon a cylindrical mandrel, winding a strain-sensitive electric conductor on said sheet while it is wrapped upon said mandrel, applying a setting plastic insulating material at any stage so far specified adding a covering of thin sheet insulating material over said winding, removing the assembly, the setting plastic being applied at a stage prior to the application of said covering and the flattening being effected at a stage subsequent to winding but when no plastic is exposed on the surface of the assembly undergoing flattening, and thereafter setting said plastic under conditions which cause it to bond the whole into an effectively integral structure.

4. A method of producing an electrical resistance strain gauge including the steps of wrapping a sheet of thin insulating material upon a cylindrical mandrel, winding a strain-sensitive electrical conductor on said sheet while it is wrapped upon said mandrel, applying a setting plastic insulating material at any stage in the sequence so far specified, wrapping a covering of thin sheet insulating material upon the winding, removing the assembly from said mandrel, flattening the assembly, and setting said plastic material under conditions which cause it to bond the whole into an effectively integral structure.

5. An electrical resistance strain gauge comprising a support of thin sheet and stiff insulating material, a quasi-helical, conductive, strain-sensitive winding thereon, cover layers of thin sheet insulating material on each side of said winding extending beyond the boundaries thereof, conductive leads attached to the ends of said winding and extending beyond the boundaries of said cover layers, and a thin thread crossing said leads near their junctions with said ends and located between said leads and one of said cover layers.

FRANK AUGHTIE.
FRANK RUSSEL THURSTON.
ERIC PIERCE COLEMAN.

REFERENCES CITED

The following references are of record in the file of this patent:

UNITED STATES PATENTS

| Number | Name | Date |
|---|---|---|
| 2,292,549 | Simmons, Jr. | Aug. 11, 1942 |
| 2,327,935 | Simmons, Jr. | Aug. 24, 1943 |